United States Patent [19]

Cascalenda et al.

[11] Patent Number: 4,602,646

[45] Date of Patent: Jul. 29, 1986

[54] HAND CARRIED DEVICE FOR FILTERING TOBACCO SMOKE

[76] Inventors: James J. Cascalenda, 1568 Miriam, Mendota Heights, Minn. 55118; Thomas J. Heimerl, 5015 Bald Eagle Ave., White Bear Lake, Minn. 55110

[21] Appl. No.: 735,690

[22] Filed: May 20, 1985

[51] Int. Cl.⁴ ............................................. A24B 19/10
[52] U.S. Cl. .................................... 131/329; 131/231
[58] Field of Search ....................... 131/329, 231, 238

[56] References Cited

U.S. PATENT DOCUMENTS 4,154,251 5/1979 Doyel .................................. 131/231
4,161,181 7/1979 Nicks et al. .

Primary Examiner—V. Millin
Attorney, Agent, or Firm—Jacobson and Johnson

[57] ABSTRACT

A miniature housing containing a miniature lightweight electrically operated blower and a tobacco smoke filter is removably mounted on the hand of the smoker adjacent the lighted cigarette or cigar or the like to draw the tobacco smoke directly into the housing through the filter media and expel the clean air through an outlet in the housing.

6 Claims, 9 Drawing Figures

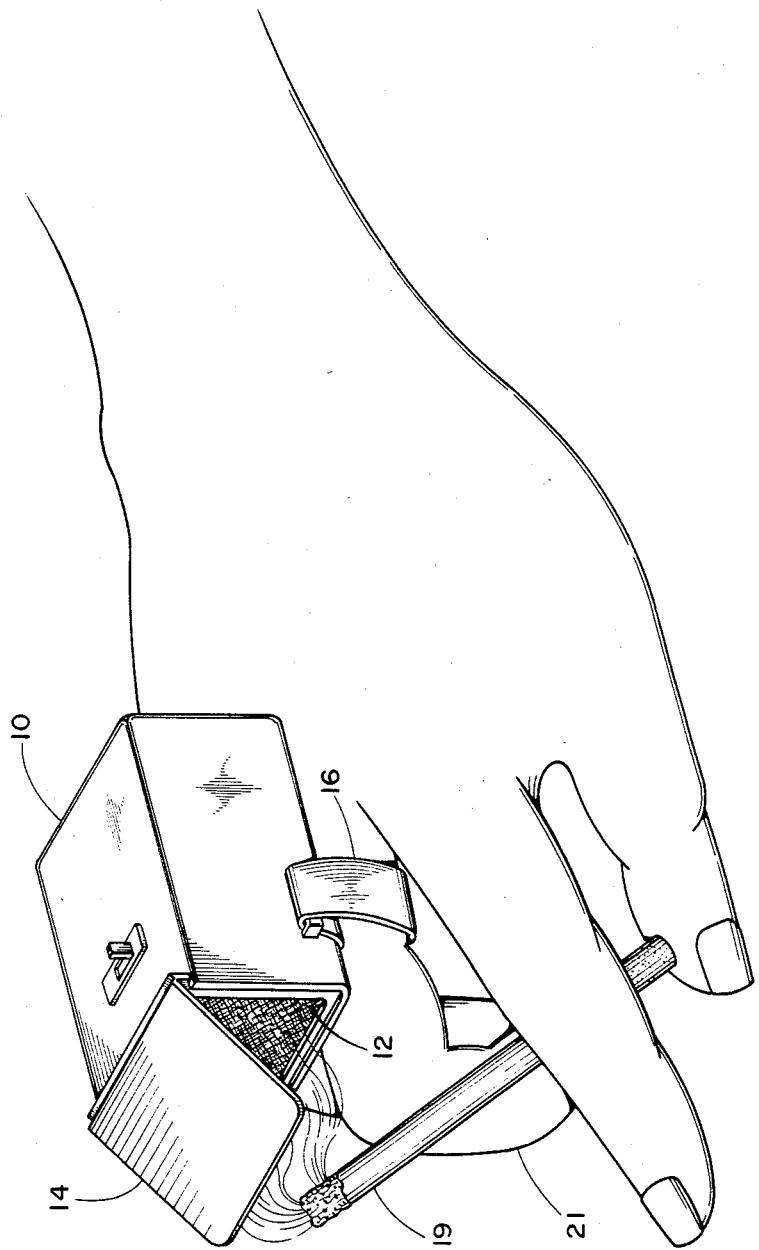

4,602,646

HAND CARRIED DEVICE FOR FILTERING TOBACCO SMOKE

BACKGROUND OF THE INVENTION

1. Field of the Invention.

This invention is directed towards the filtering and cleaning of tobacco smoke in a room and, more specifically, toward providing means to direct the smoke as it leaves the cigarette or cigar or the like immediately into the filter element to minimize the pollution in the room caused by the tobacco smoke.

2. Description of the Prior Art

There is known to be a number of prior art devices particularly directed toward filtering tobacco smoke which utilize small electrically operated blowers mounted in a suitable housing to pull the tobacco smoke through a filter element to clean the air. Examples of these are the following: Gilbertson U.S. Pat. No. 3,516,232; Kirk U.S. Pat. No. 4,052,179; and Doyel U.S. Pat. No. 4,154,251. All of these prior devices are generally associated with or located adjacent to an ash tray to draw out and filter the tobacco smoke when the cigarette is burning or resting in the ash tray.

The present invention is directed toward locating the tobacco smoke filter as close as possible to the source of the smoke, that is, on the smoker's hand.

SUMMARY OF THE INVENTION

The invention utilizes a conventional, miniature blower with suitable electrical energy source for energizing the blower contained in a housing. However, the device is made even smaller than prior art devices in order to make it as inconspicuous as possible and also to make it as lightweight as possible.

Attached to the housing is a mounting means such as a strap or the like which can be at least partially placed around a hand and/or, preferably, the finger of the smoker to hold the air purifying device in place with the air inlet to the filter media placed as close as possible to the cigarette or cigar which is being held in the hand of the smoker. The inlet opening is covered over with a removable filter for replacement of the filter media. In one embodiment, a hood is located along an edge of the inlet opening to help direct the flow of the tobacco smoke directly into the inlet and through the filter media. In this latter embodiment, preferably the hood is angularly adjustable to provide an optimum angle to the location of the cigarette that would be most effective for its purpose.

DESCRIPTION OF THE DRAWING

FIG. 9 illustrates an embodiment of the invention mounted on the finger of the cigarette smoker.

DESCRIPTION OF THE PREFERRED EMBODIMENTS

Figure 1:
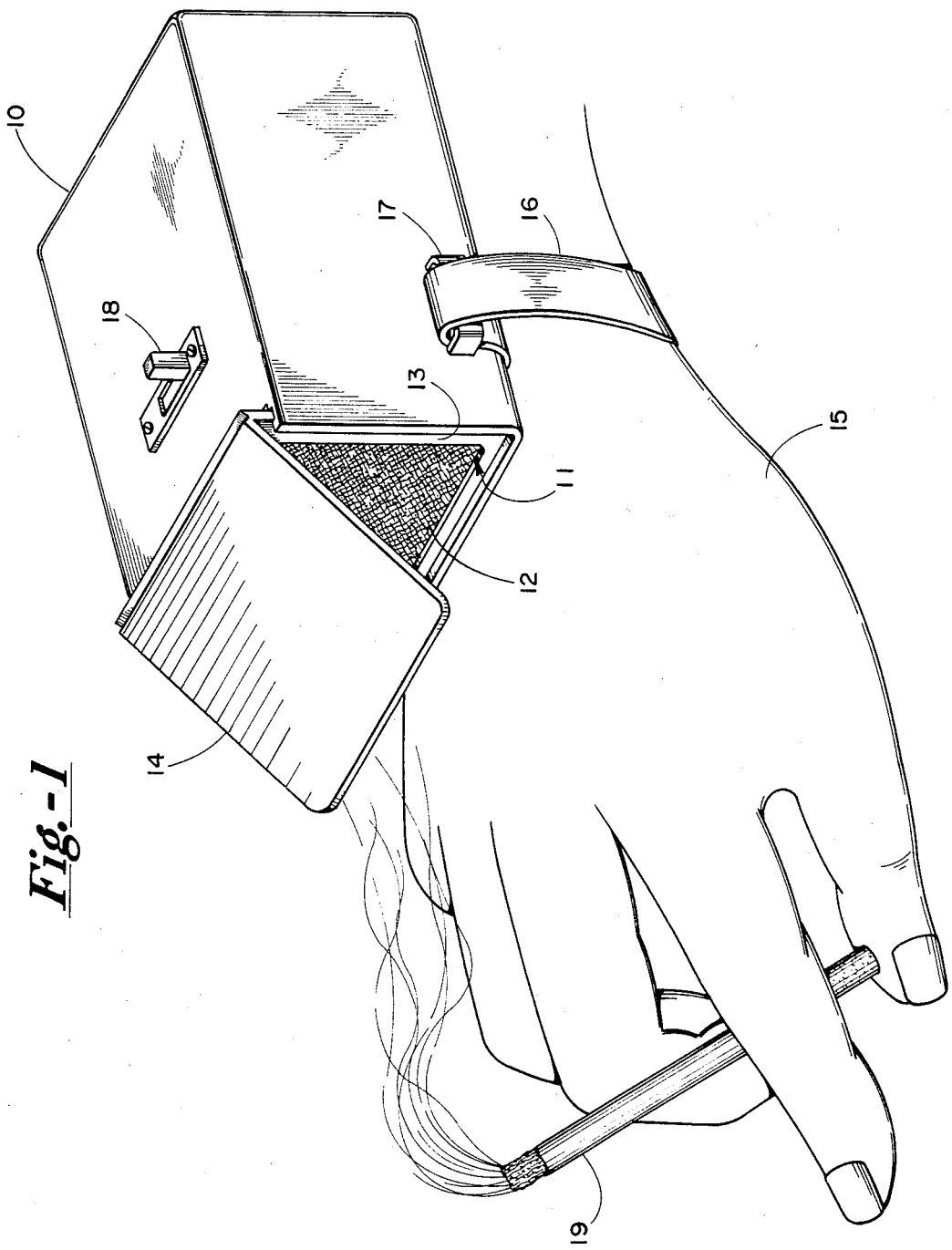
FIG. 1 is an embodiment of the invention shown mounted and resting on the back of the hand of the cigarette smoker.

FIGS. 1 and 9 illustrate the manner in which the instant invention is utilized. In FIG. 1 a housing 10 containing an electrically driven rotary blower, which will be described later, has an inlet opening 11 covered over with a filter media 12 enclosed in a frame 13 and an angled downward hood 14. The housing 10 is mounted on the back of a smoker's hand 15 and is held in place by a strap 16 which is looped through hooks 17 attached to opposite outside walls of housing 10 (only one hook shown in FIG. 1). A hand operable switch 18 is conveniently provided to manually turn the blower on and off. The housing is located with the inlet opening 11 near and facing the burning cigarette 19 held in the smoker's hand so that the smoke from the burning cigarette is readily drawn into the housing through the filter media. FIG. 9 illustrates housing 10 with the framed-in filter media 12 and hood 14 mounted on finger 21 of the cigarette smoker and attached with strap 16 so that the filter media is brought even closer to the source of tobacco smoke from the burning cigarette 19.

Figure 2:
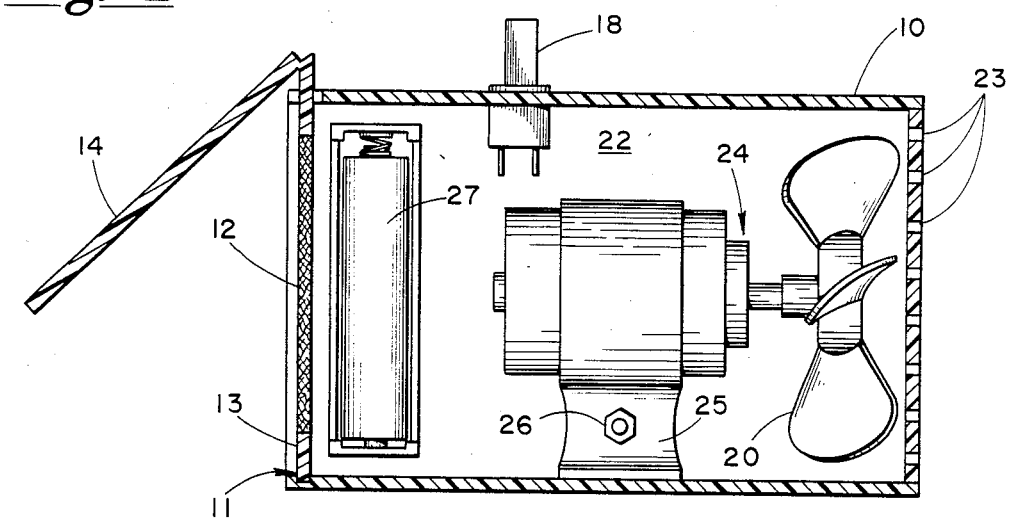
FIG. 2 shows the arrangement of the component parts of the filtering device constituting an embodiment of the invention.

FIG. 2 illustrates the arrangement of component parts of the air purifying device. The outer walls of housing 10 define an enclosed chamber 22 having inlet opening 11 covered with the filter media 12 enclosed in its frame 13 and outlet openings 23 opposite the blower blades 20. An electrically operated rotary blower 24 is mounted in the chamber 22 in the housing in some convenient fashion, such as with bracket 25 clamped with nut 26. Also attached to housing 10 within the chamber is a suitable energy source for the blower 24 such as battery 27. Switch 18 can be manually operated to close the circuit between battery 27 and blower 24 in a conventional fashion so that the rotor 20 of the blower rotates to pull air into the chamber 22 through the filter media and expel it out the outlet openings 23. The embodiment illustrated in FIG. 2 further includes hood 14 which is attached to the top edge of the filter frame 13 and is angled downward and forward to help direct the flow of tobacco smoke into chamber 22 through the filter media 12.

Figure 3:
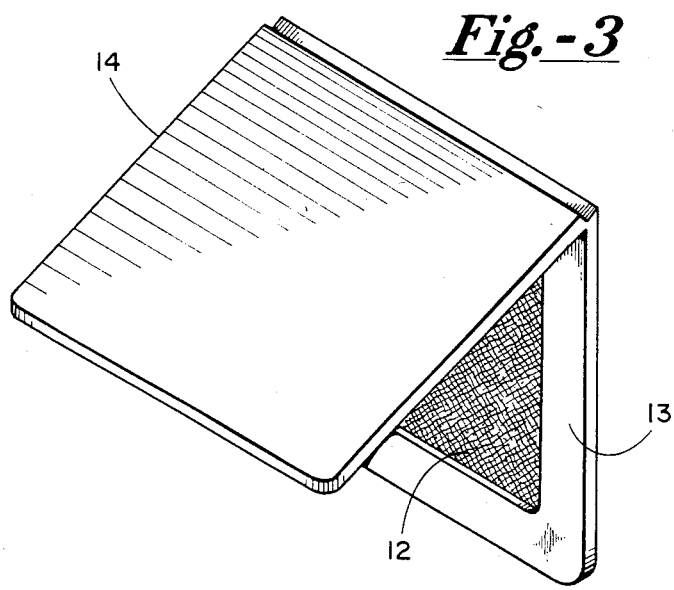
FIG. 3 is a more detailed view of the filter element and attached hood.
Figure 4:
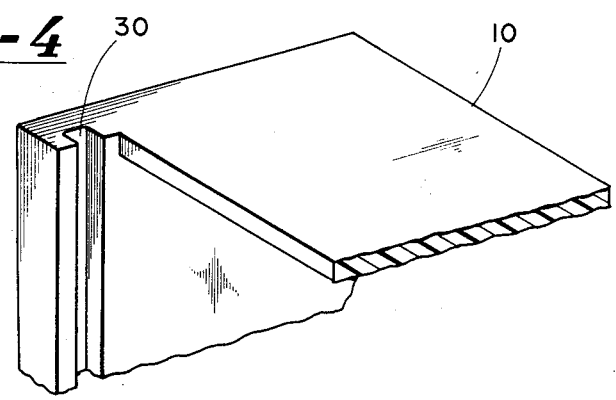
FIG. 4 shows detail of the means for mounting the filter in the housing.

As illustrated more clearly in FIG. 3 the hood may be hingedly attached to the top edge of filter frame 13. This can be done by making the junction between the hood 14 and the filter frame 13 out of a somewhat pliable material which permits hood 14 to be set to different angular positions or, alternatively, a suitable mechanical hinge can be used. In any event, the two are connected together so the hood can be swung up and down as desired in order to set it to the optimum angle for being most effective to direct the flow of the tobacco smoke through the filter media 12 by the force of the blower. To accommodate the filter frame 13, grooves 30 are formed on opposite sides of the inlet opening 11 (only one groove shown in FIG. 4) so that frame 13 can be slid onto housing 10 and held in place and yet be easily removed for replacement of the framed-filter or the filter media alone.

Figure 5:
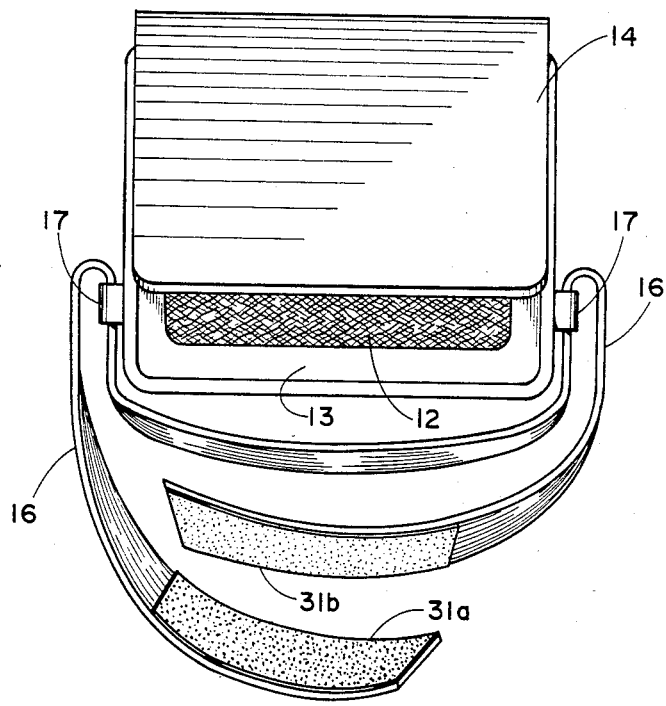
FIG. 5 is a front view of an embodiment of the invention utilizing a hood.
Figure 6:
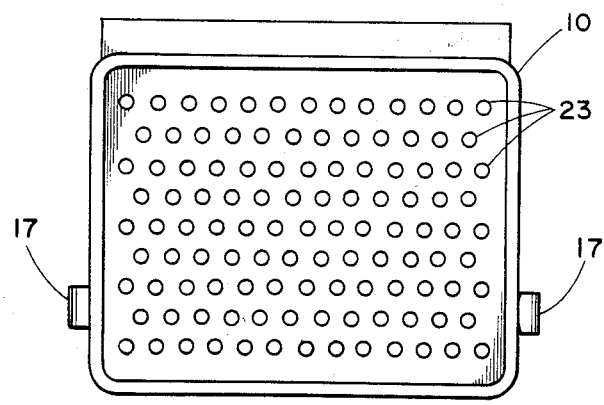
FIG. 6 is a rear view of an embodiment of the invention.
Figure 8:
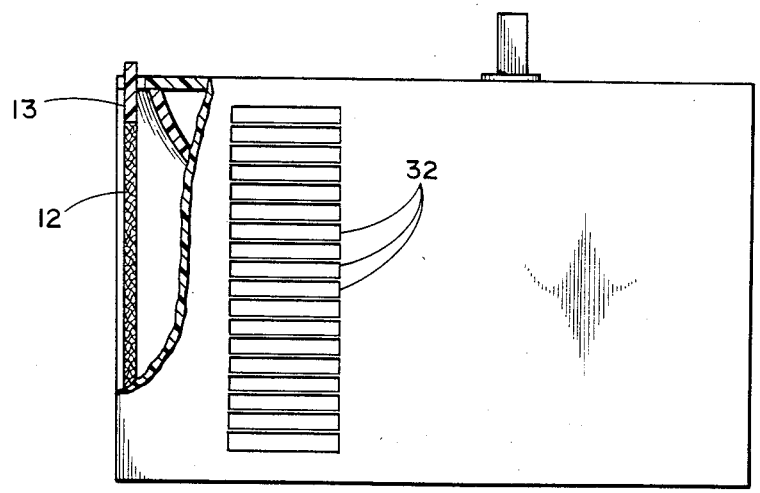
FIG. 8 is a side view of an embodiment of the invention illustrating an outlet opening in the side of the housing.

A preferred means for removably attaching the filtering device to the smoker's hand or finger is illustrated more clearly in FIG. 5. Hooks 17 are attached at the lower side walls of housing 10 and a strap 16, preferably made out of some suitable elastic material, is looped through the hooks 17 with the distal ends of the strap hanging loose. The strap can then be wrapped around the hand or the finger of the cigarette smoker and tightened and held in place by mating parts of the Velcro fastener 31a and 31b. The air outlet from the housing chamber 22 may be provided by perforations 23 in a wall of housing 10 (FIG. 2) or, as illustrated in FIG. 8, by slots 32 through a side wall of housing 10.

Figure 7:
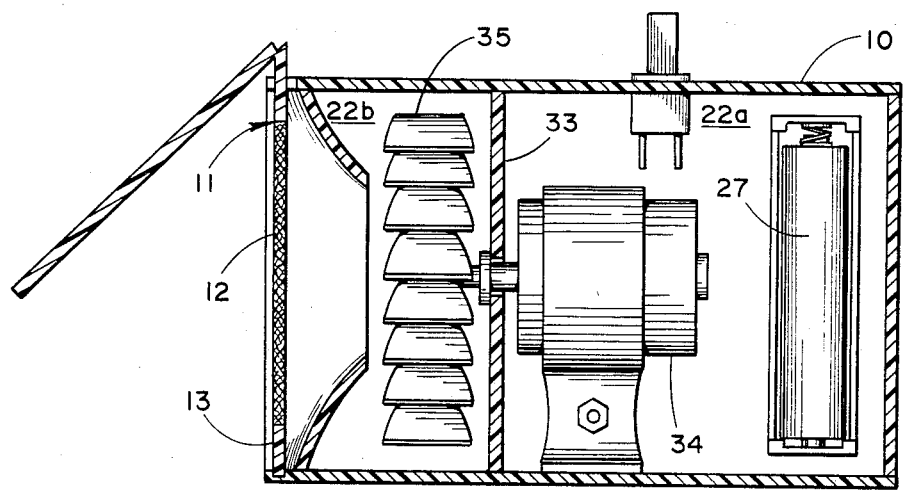
FIG. 7 illustrates an embodiment of the invention with a different arrangement of components comprising the filtering device.

FIG. 7 illustrates another arrangement for the mechanisms of the air cleaner contained in housing 10. In this arrangement, an interior wall 33 separates chamber 22 in housing 10 into two separate compartments 22a and 22b. Compartment 22a contains the stator 34 of the rotary blower and the battery 27. Rotor 35 extends from stator 34 into compartment 22b so it is closer to the inlet opening 11 and filter media 12 to more effectively draw the tobacco smoke through the filter media 12 and expel it through the outlet in the form of slots 32 in the wall of housing 10 (FIG. 8). In the embodiment illustrated in FIG. 8 the framed filter does not have an attached hood.

In drawings FIGS. 2 and 7 illustrating the interior of the housing 10, the necessary wiring between the components of the switch 18 and the battery 27 and the rotary blower 24 (or stator 34) is omitted for the purposes of clarity. The wiring circuitry for operating the blower under control of the switch is conventional and is readily known to one of ordinary skill in the art.

A number of different materials are suitable to be used as the filter media 12 provided they allow the smoke to be drawn readily through the media and do an effective job of filtering. These materials are commercially available and do not, per se, constitute a novel aspect of the instant invention.

Although the illustrated embodiments are described as utilizing an elasticized band 16 for attaching the housing to the cigarette smoker's hand or finger, it is anticipated that a variety of other means for making this type of attachment can be utilized provided they are capable of holding the housing in its desired location on the hand or the finger of the smoker. In addition, it is contemplated that the framed filter media with or without the attached hood can be removably attached to the housing in fashions other than that shown in the illustrated embodiment. For example, the frame could be snapped or clipped onto the housing or could be adhesively attached. The significant aspect is that the filter media should be removable for replacement or for cleaning.

In addition it is contemplated that the housing may be made in a different and more attractive shape instead of the rectangular shape illustrated in the drawing.

We claim:

1. A personal, miniature device for filtering tobacco smoke coming from a hand-held lighted cigarette, cigar or the like, comprising:
   (a) a miniature, lightweight housing dimensioned for resting on a part of a hand in which a lighted cigarette is held, said housing comprising outer walls around an interior chamber;
   (b) a lightweight miniature electrically operated rotary blower and electrical power source for energizing said blower located within said housing chamber, said blower operable to draw air into and expel air out of said chamber;
   (c) an inlet opening to said chamber through a wall of said housing;
   (d) an outlet opening from said chamber through a wall of said housing;
   (e) tobacco smoke filtering media enclosed in a surrounding frame;
   (f) means for removably attaching said frame-enclosed filter media to said housing for covering over said inlet opening; and
   (g) means attached to said housing for releasably mounting said housing on a hand in which a cigarette is held with said inlet located near and directed toward the lighted end of the cigarette and said outlet opening located remote from the cigarette whereby when said blower is operated smoke from the lighted cigarette is drawn through the filtered inlet opening into the housing chamber and expelled through the outlet opening.

2. The device as described in claim 1 wherein said housing has grooves on two opposite sides of the inlet opening for slidably receiving the frame enclosed filter media.

3. The device as described in claim 1 wherein said hand-mounting means comprises means for at least partially closing around a finger of the hand.

4. The device as described in claim 2 further including a hood extending out from said housing from an edge of said inlet opening for aiding in directing smoke into said inlet opening.

5. The device as described in claim 4 wherein said hood is angularly adjustable.

6. The device as described in claim 4 wherein said hood is attached to an edge of the frame of said filter media.

* * * * *